(12) United States Patent
Vick et al.

(10) Patent No.: US 7,082,532 B1
(45) Date of Patent: Jul. 25, 2006

(54) METHOD AND SYSTEM FOR PROVIDING DISTRIBUTED WEB SERVER AUTHENTICATION

(75) Inventors: Cornelius V. Vick, Sacramento, CA (US); David A. Mills, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/475,062

(22) Filed: Dec. 30, 1999

(51) Int. Cl.
*H04L 9/00* (2006.01)
*G06F 15/173* (2006.01)

(52) U.S. Cl. ............... 713/155; 713/156; 713/157; 713/158; 713/159; 709/226

(58) Field of Classification Search ............ 713/155, 713/156, 157, 158, 159; 709/226
See application file for complete search history.

(56) References Cited

U.S. PATENT DOCUMENTS

| | | | |
|---|---|---|---|
| 5,875,296 A * | 2/1999 | Shi et al. | 713/202 |
| 6,205,480 B1 * | 3/2001 | Broadhurst et al. | 709/225 |
| 6,584,505 B1 * | 6/2003 | Howard et al. | 709/225 |
| 6,678,731 B1 * | 1/2004 | Howard et al. | |

OTHER PUBLICATIONS

Http://www.axent.com/product/dsbu/default.htm.
Yasin, Rutrell, "Axent Makes Token Move Toward User Authentication," *Internet Week*, Dec. 14, 1998.
Http://www.infoworld.com/cgi-bin/displayStat.pl?pageone/news/features/iw100/98iw100.oppenheimer.htm.
Http://www.axent.com/product/dsbu/def2.htm.
Http://vpo.axent.com/prna/press/dsspr.htm.
Http:www.axent.com/product/rsbu/webdef/default.htm.
Bruno, Lee, "Putting Up a Better Web Defense—Axent Technologies' Web Defender Tightens Security for End-Users Accessing Web Servers," *TECHWEB*, Jun. 1998.
Gray, Dennis, "Single Sign-On Security Across Distributed Web Information," *WEBDEFENDER*, 1998.
Http://vpo.axent.com/prna/press/webdef.htm.
Http://www.platinum.com/products/sysman/security/sso_ps.htm.
Http://www.platinum.com/products/brochure/security/b_sso.htm.
Http://www.platinum.com/products/sysman/security/sso_to.htm.
Http://www.platinum.com/products/security/pres/sso_ptnr.htm.
Kristol, D., et al., "HTTP State Management Mechanism," *Netscape Communications*, Feb. 1997.
Http://remus.rutgers.edu/java1.1docs/docs/guide/security/cert2.html.
Http//mercproj.lbl.gov/mercury/cappt/sld001.htm.

* cited by examiner

*Primary Examiner*—Matthew Smithers
*Assistant Examiner*—Courtney Fields
(74) *Attorney, Agent, or Firm*—Crystal D. Sayles

(57) ABSTRACT

A method and system for providing distributed web server authentication of a user in web servers using a shared secret key. The method and system include receiving a request to connect a user to a web server, creating a user password cookie using a shared secret key and transmitting the user password cookie in response to the request to connect. An implementation of the method and system includes establishing a connection between the web server and a second user using a second user password cookie and the shared secret key. Another implementation of the method and system includes establishing a connection between the user and a second web server using the user password cookie and the shared secret key.

31 Claims, 6 Drawing Sheets

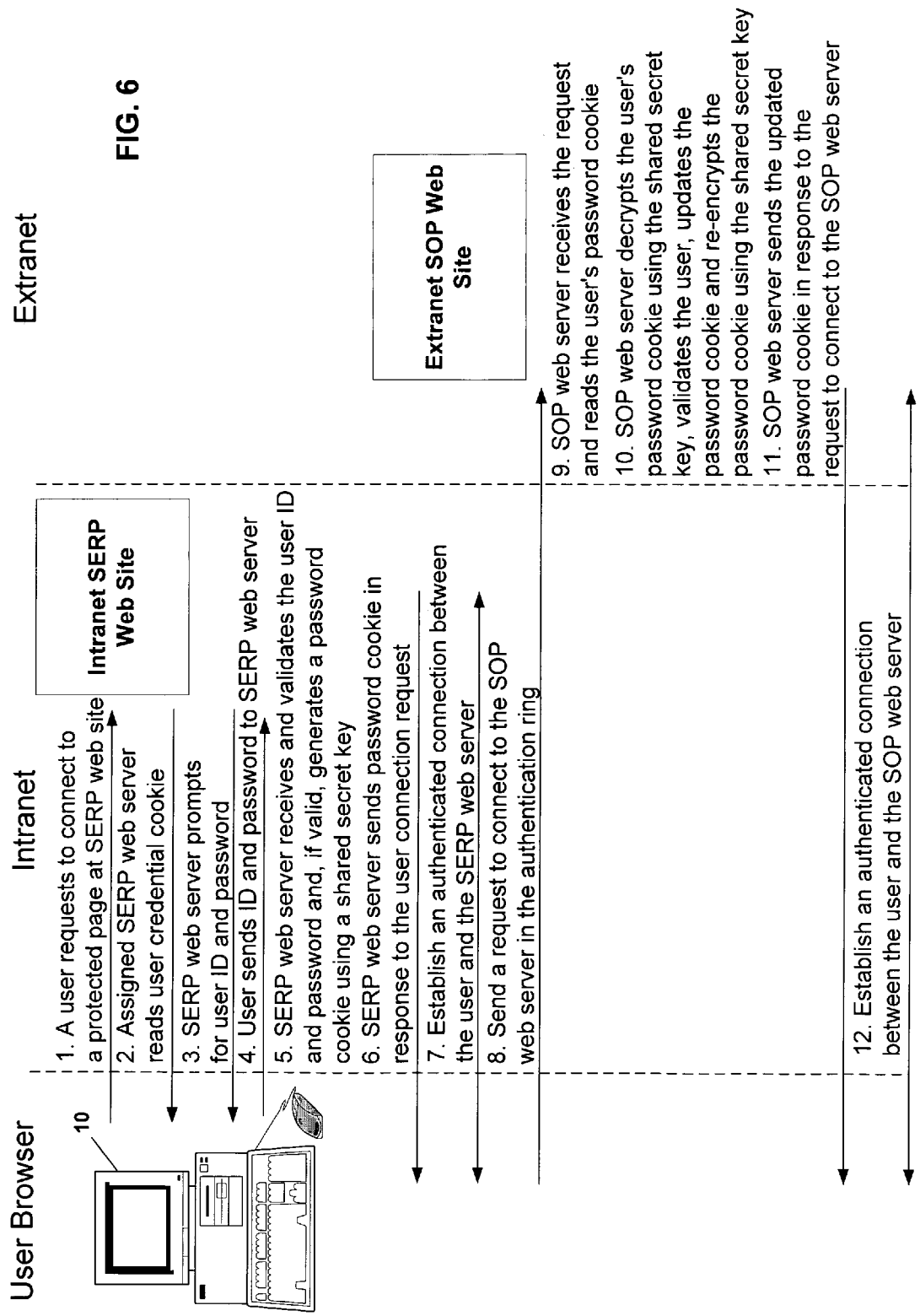

METHOD AND SYSTEM FOR PROVIDING DISTRIBUTED WEB SERVER AUTHENTICATION

FIELD OF THE INVENTION

The present invention relates to secure, distributed web server authentication of users using a shared, single key in both a single enterprise and across separate enterprise multiple-server configurations.

BACKGROUND OF THE INVENTION

Currently, user authentication is accomplished in at least two ways: 1) user identification ("ID") and password or 2) ITU-T X.509 certificates, ITU-T Recommendation X.509, published August 1997. In addition, large web sites often provide the same content on multiple web servers and use Domain Name Service ("DNS"), Internet Standards Track Standard 0013, STD0013-Domain Name System, published November 1987; round robin; or other technology to redirect user requests to one of the many servers. The use of multiple web servers is done to balance the load on the web site and provide the ability to take a server offline for maintenance or add servers during high load periods. In existing systems a user is prompted for authentication information, for example, user ID and password, each time the user hits a server the user has not yet visited.

FIG. 1 illustrates a simplified network flow diagram of existing user ID and password authentication systems. In FIG. 1, user workstation 10 is connected to web site A 40 via the Internet 30 and Internet Service Provider ("ISP") 20. Web site A 40 is comprised of multiple web servers a, b, c and d 41, 42, 43 and 44, respectively. Web server a 41 is shown coupled to web server b 42 via a first communication line segment 45, web server b 42 is in turn coupled to web server c 43 by a second communication line segment 46, web server c 43 is in turn coupled to web server d 44 by a third communication line segment 47, and web server d 44 is in turn coupled to web server a 41 by a fourth communication line segment 48 to complete the network.

To access secure web site A 40 or a secure page on a web site A 40, in FIG. 1, the user first establishes an Internet connection using an Internet browser program (for example, Netscape Communicator® or Microsoft Internet Explorer®) which is running on user workstation 10. Netscape Communicator® is licensed by Netscape Communications Corporation of Mountain View, Calif. Microsoft Internet Explorer® is licensed by Microsoft Corporation of Redmond, Wash. Once connected to the Internet, the user requests access to web site A 40 by entering the Universal Resource Locator ("URL") for the home page of web site A 40 in the address block of the Internet browser program. After web site A 40 receives the user's connection request, the request is routed to an available web server, for example, web server a 41, which sends a prompt for the user to enter a user ID and password. After the user enters and sends the user's user ID and password to web server a 41, web server a 41 validates the user ID and password and establishes a connection between the user's browser at workstation 10 and the requested home page of web site A 40. As the user moves through web site A 40 it frequently becomes necessary for the user to connect to a new web server. When this happens, the new web server, for example, web server b 42, receives a request to connect to the user. The user is required to re-enter and send the user's user ID and password to web server b 42 for validation prior to establishing a connection between the user's browser at workstation 10 and the requested page at web server b 42. In the system in FIG. 1, the user may need to enter the user's user ID and password up to four separate times at web site A 40 to logon to each of the four web servers.

A prior art alternative to constantly requiring the user to re-enter the user's ID and password is to use X.509 certificates. These "certificates" are encrypted electronic signatures provided by a Certificate Authority ("CA") that certify the identity of the user. Certificates are used by some web sites to provide user authentication and, while certificates do not require the re-entry of the user ID and password each time the user contacts a new server, certificates do require a trusted third party to "certify" the identity of the user. This trusted third party is the CA, such as, VeriSign, Inc. of Mountain View, Calif. The challenge with a certificate system is finding a common third party that both the user and the server trust. Another alternative is for the web site owner or Internet Service Provider (ISP) to issue the certificates themselves. Unfortunately, setting up and running a CA is neither a trivial nor a problem free task. In addition, once a company sets up the CA, it may find that other entities are using the company's certificates for authentication, as a result of the company's status and reputation. Additionally, revocation technology and the infrastructure for certificates is still being developed.

FIG. 2 illustrates a network diagram of an exemplary user certificate authority authentication system. FIG. 2 is identical to FIG. 1 except, in FIG. 2, a CA 50 is connected to the Internet 30 and can communicate with both the user workstation 10 and web site A 40.

In CA systems the initial user logon and traversal of the web site are essentially identical to the description provided for FIG. 1. As in the process outlined above for FIG. 1, when web server a 41 receives the user ID and password, web server a 41 sends the user ID and password to the CA 50 and requests a certificate validating the identity of the user. Once the CA 50 validates the user ID and password, the CA 50 creates a certificate and sends the certificate back to web server a 41. Web server a 41, in turn, sends the certificate to the user and then connects to the user. Another difference occurs when a new web server, for example, web server b 42, needs to be accessed. Once web server b 42 receives the access request, web server b 42 reads and validates the user's certificate and establishes a connection between the user's browser at workstation 10 and the requested page of web site A 40 without requiring the user to re-enter the user's user ID and password again. However, if the certificate is not valid, then, web server b 42 must obtain a new certificate before connecting to the user. While this certificate system is an improvement over the basic ID and password system of FIG. 1, the certificate system now requires that a third party or an additional and expensive local certificate system generate and certify the user certificates.

While current systems may use cookies to identify users, there are none that use the cookie to pass user credentials between servers nor are any of the current systems capable of working across multiple, separate enterprises.

Therefore, what is needed is a system that is simpler to implement and administer than ID and password or certificate systems, can only be used by the company or group that created the system, enables the passing of user credentials between multiple, separate enterprise servers, permits the immediate revocation of user authentication and access and is useable from any computer capable of Internet access without the user having to hand carry a special key or token to each computer.

SUMMARY OF THE INVENTION

Embodiments of the present invention provide a method and system for providing distributed web server authentication of users. The method and system include receiving a request to connect a user to a web server, determining if the user is a valid user and denying access to the user, if the user is not valid. If the user is valid, the method and system update the user password cookie using a shared secret key, when a valid user password cookie exists, or generate the user password cookie using the shared secret key, when no valid user password cookie exists. The method and system further include transmitting the user password cookie to the user and connecting the web server to the user.

BRIEF DESCRIPTION OF THE DRAWINGS

FIG. 6 illustrates a message flow diagram of another embodiment of the present invention.

DETAILED DESCRIPTION

Figure 1:
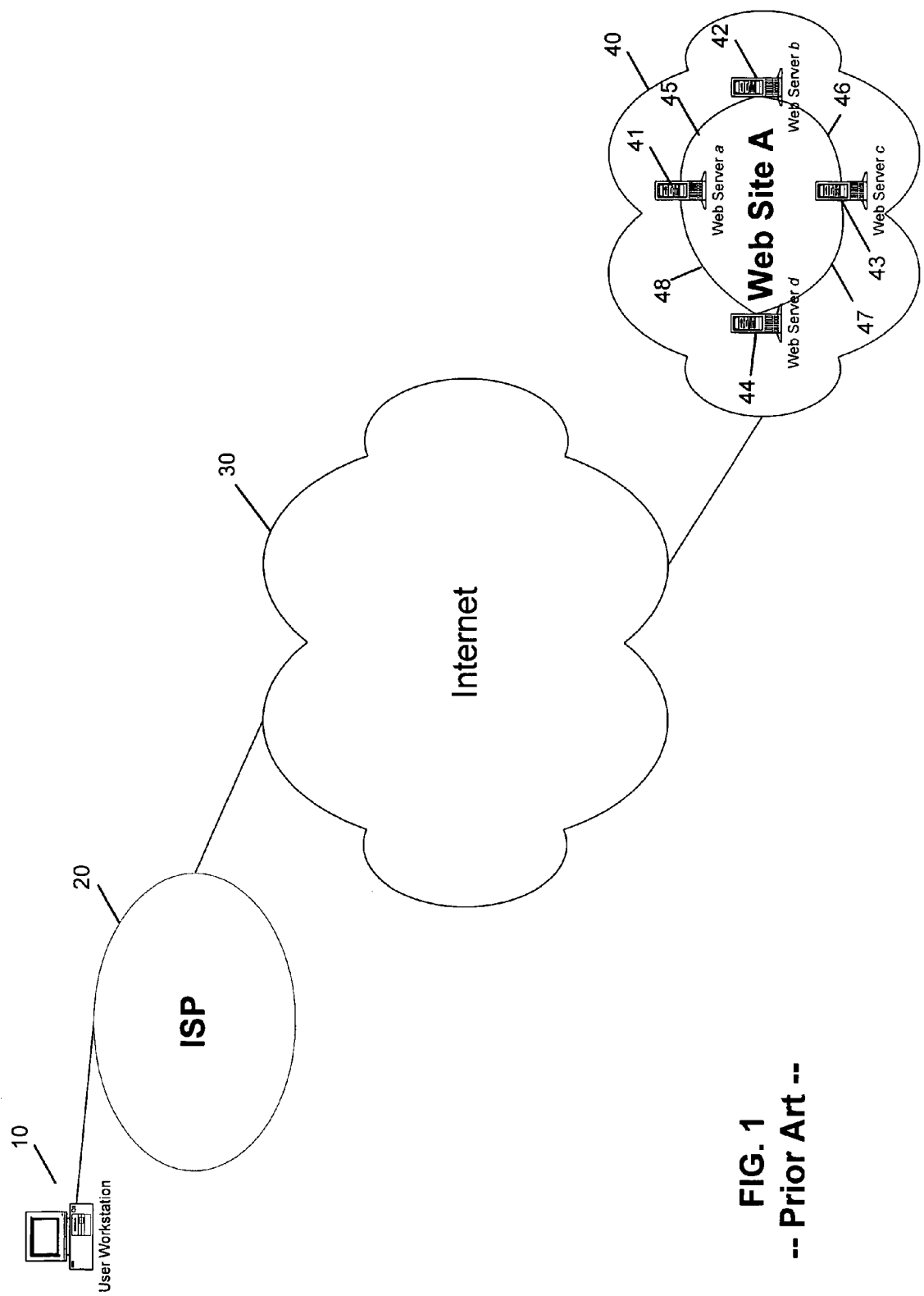
FIG. 1 illustrates a prior art network diagram of an exemplary user ID and password authentication system.

In accordance with embodiments of the present invention, when a user attempts to access a web server in an authentication ring, the web server requests a user ID cookie and a credential cookie from the user. An "Authentication Ring" is an arbitrary collection of web servers, commonly spread across multiple and separate enterprise web sites, that share a common authentication mechanism, user base and secret key. A "cookie" is a header which carries state information between participating web servers and users. The current HTTP/1.0 cookie specification is Internet Standards Track protocol RFC1945, Internet Official Protocol Standards, RFC1945-Hypertext Transfer Protocol—HTTP/1.0, published May 1996. A separate cookie is usually created by each separate web site and saved on the user's computer. The "User ID Cookie" contains the user ID for the user. The "Credential Cookie" contains the information needed to certify that the user is who the user claims to be. The web servers in the authentication ring can be grouped on a single web site or multiple web sites. If the user doesn't have a valid credential cookie for the site, for example, the time stamp is too old or the password is invalid, then, the user is redirected to a LOGON page where the user's user ID and password must be re-entered. If the User ID Cookie exists, it is filled in on the LOGON Page. The web server authenticates the entered user ID and password pair against a local authentication mechanism, for example, an operating system. If the user ID and password are authenticated, the web server creates an encrypted password cookie containing user information selected from, for example, the user's user ID and password, IP address and a time stamp, and where the encryption is performed using a secret key known only to those web servers participating in the authentication ring. A "time stamp" specifies the date and time that the password cookie was created or last updated. Each time the user hits a new web server, the new web server updates the time stamp in the password cookie. For example, if the time stamp is older than a system configurable interval, the user is redirected to the LOGON page to re-authenticate by re-entering the user's user ID and password.

Once the user is authenticated, the web server can apply access control to data to protect the data from disclosure, associate an identity with the user ID and track access and usage. Similarly, the user can navigate the site or authentication ring without being asked to re-enter the user's user ID and password again. Since the credentials (user ID and password), of the current user can be automatically retrieved from the user by the server at any time, it is unnecessary to request that the user re-enter the user ID and password credentials each time the user attempts to connect to a different server.

Embodiments of the present invention can be used by both individual and related local and remote web sites to implement user authentication without waiting for a fully functional certificate technology to emerge. Additionally, embodiments of the present invention will enhance and simplify the user's experience with the web site. In another embodiment, the present invention is used in virtual private web rings to give the user the appearance of a single log-in across multiple sites. "Virtual Private Web Rings" are a federated group of sites which support the same cookie key.

Figure 2:
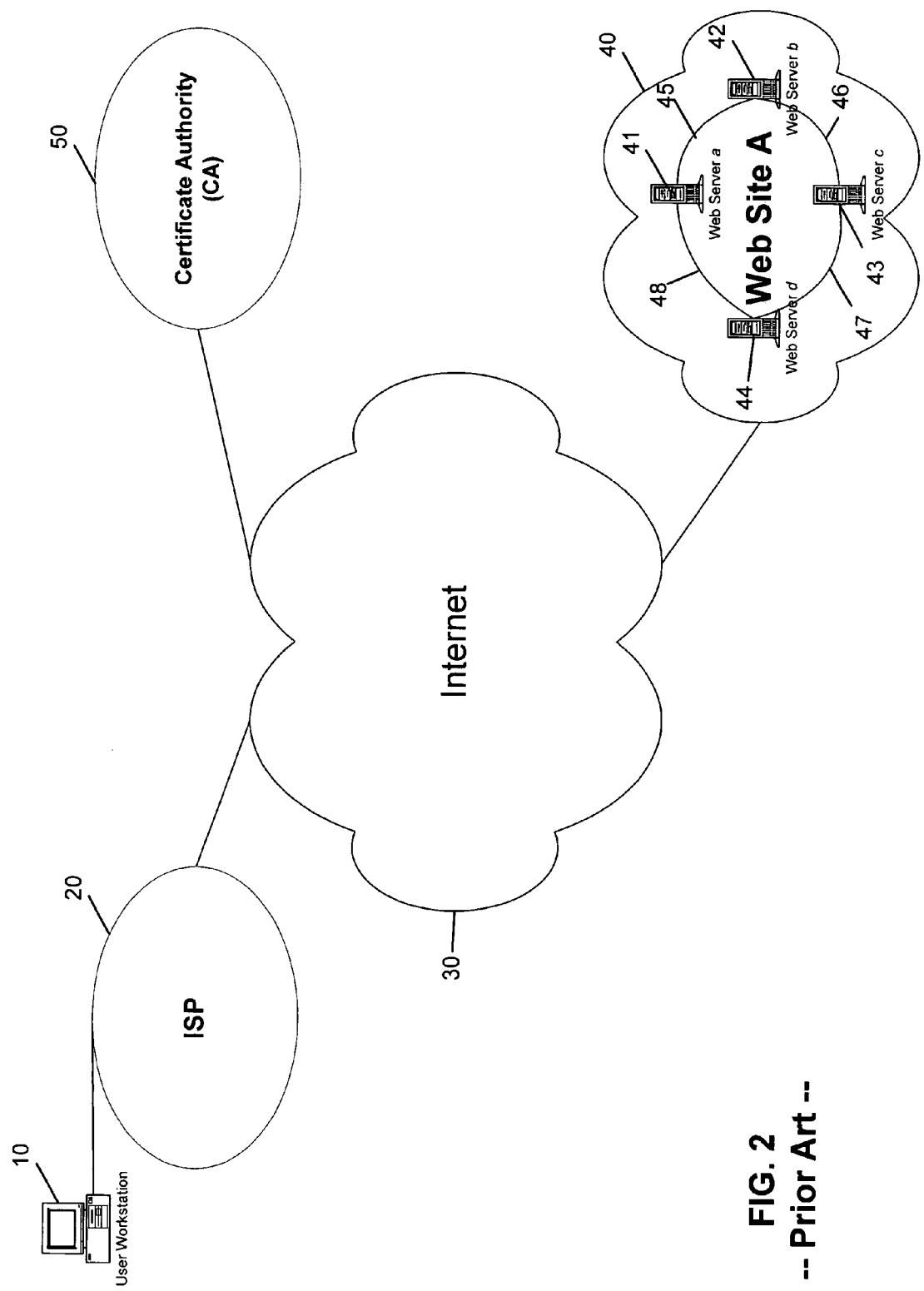
FIG. 2 illustrates a prior art network diagram of an exemplary user certificate authority authentication system.
Figure 3:
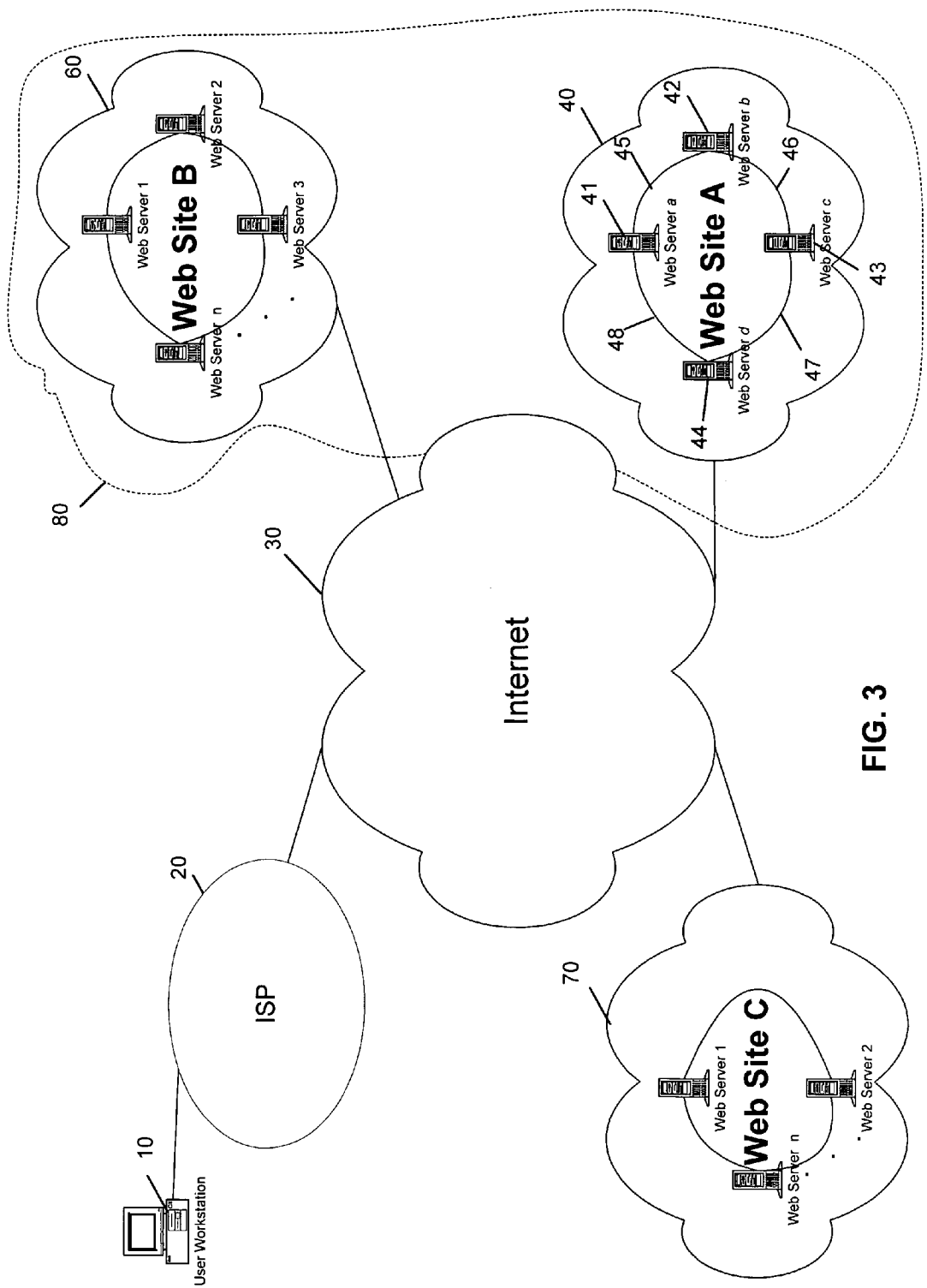
FIG. 3 illustrates a network diagram of an embodiment of the present invention.

FIG. 3 illustrates a network diagram of an embodiment of the present invention. In FIG. 3, all elements associated with the user workstation 10, ISP 20, Internet 30 and web site A 40 are as described in FIGS. 1 and 2. Additionally, in FIG. 3, a web site B 60 and a web site C are connected to the Internet 30 and both web site B 60 and web site C 70 are configured similar to web site A 40. This similar configuration of web sites A, B and C is merely for ease of explanation and in no way limits the scope of the present invention. In fact, the exact configuration of the web sites is immaterial to all embodiments of the present invention. Web site A 40 and web site B 60 are shown associated in an authentication ring 80. Note that while web site C 70 is not a part of authentication ring 80 in the embodiment shown in FIG. 3, alternative embodiments are contemplated where web site C 70 is part of the authentication ring 80.

Figure 4:
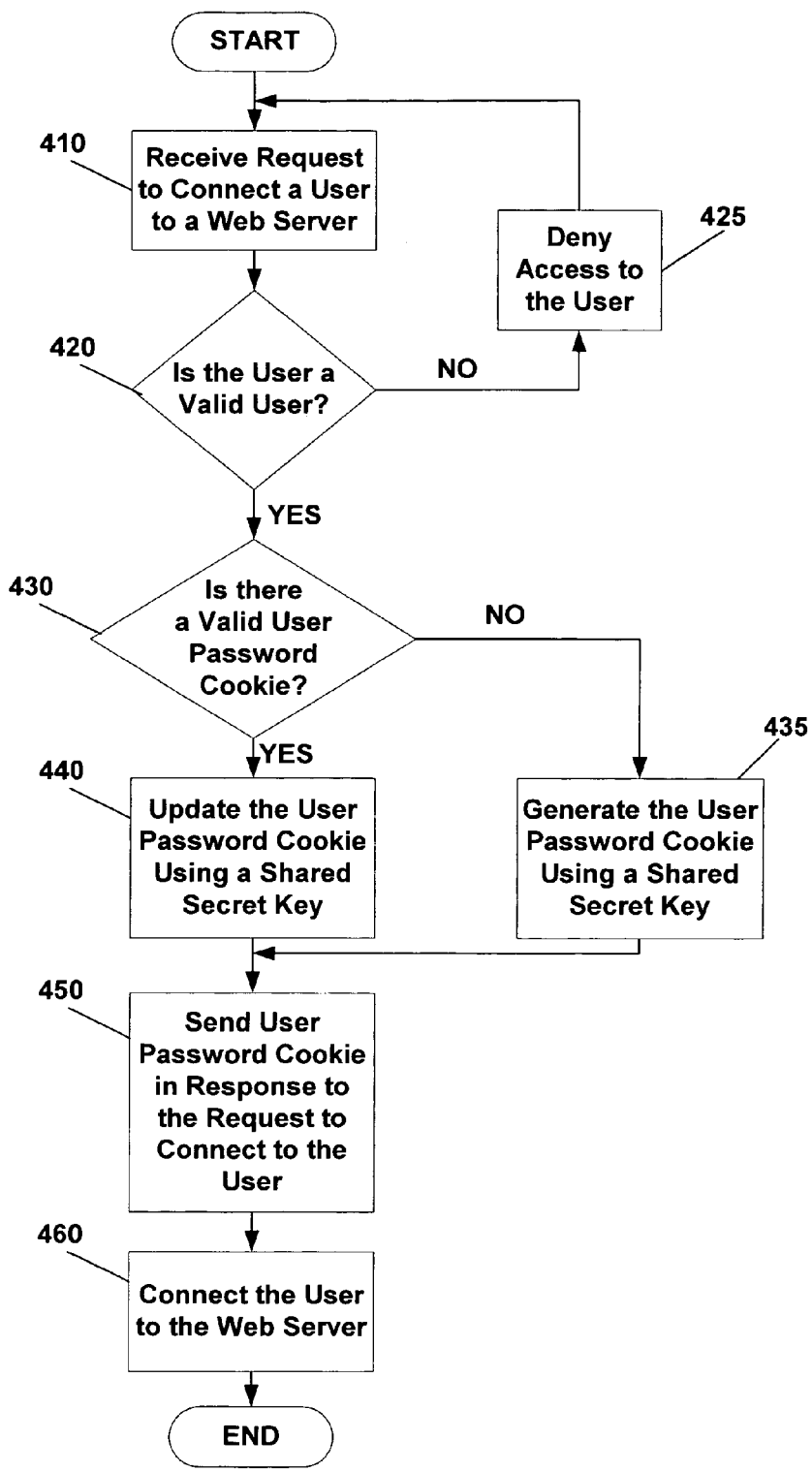
FIG. 4 illustrates a flow diagram of an embodiment of the present invention.

FIG. 4 illustrates a flow diagram of an embodiment of the present invention. In FIG. 4, in block 410, a request to connect a user to a web server is received at the web server. In block 420, the web server determines if the user request has come from a valid user. If, in block 420, the web server determines that the user is not a valid user, then, in block 425, the user is denied access to the web server and the process loops back to block 410 to wait for another user request to connect to the web server. If, in block 420, the web server determines that the user is a valid user, then, in block 430, the web server determines if there is a valid user password cookie. If, in block 430, the web server determines that there is not a valid user password cookie, then, in block 435, the user password cookie is generated using a shared secret key and the process continues with block 450. If, in block 430, the web server determines that there is a valid user password cookie, then, in block 440, the user password cookie is updated using the shared secret key. In block 450, the web server transmits the user password cookie in response to the request to connect the user. In block 460 the web server connects the user to whichever page was requested in the original connection request.

In accordance with embodiments of the present invention, determining if the user is a valid user involves reading a user credential cookie, requesting a user identification (ID) and password, receiving the user ID and password and validating the user's identity. Where, validating the user's identity involves authenticating the user ID and password with the credential cookie using a local authenticating mechanism, for example, an operating system, and if the user ID and password are authenticated, generating a password cookie for the user using a shared secret key, otherwise, the user ID and password are re-requested from the user.

In accordance with embodiments of the present invention, determining if the user is a valid user, involves obtaining the user password cookie and verifying that the user password cookie is valid. If the user password cookie is determined to be valid, then, the user is valid, if the user password cookie is determined to be not valid, then, the user is not valid.

In accordance with embodiments of the present invention, the web server is part of a common authentication ring having the shared secret key.

In accordance with embodiments of the present invention, generating the user password cookie using a shared secret key involves combining at least the user ID and password with a time stamp and encrypting the combined user ID, password and time stamp using the shared secret key.

In accordance with embodiments of the present invention, establishing a connection between the web server and a second user using a second user password cookie and the shared secret key involves receiving a request to connect the second user to the web server and determining if the second user is a valid user. If the second user is determined to be not valid, then, the second user is denied access to the web server. If the second user is determined to be valid, and if a valid second user password cookie exists, the second user password cookie is updated using the shared secret key. However, if the second user is valid but no valid second user password cookie exists, then, the second user password cookie is generated using the shared secret key. Regardless, whether the second user password cookie is updated or generated, the second user password cookie is transmitted in response to the request to connect the second user and the web server is connected to the second user.

In accordance with embodiments of the present invention, establishing a connection between the user and a second web server using the user password cookie and the shared secret key involves receiving a request to connect the user to the second web server and determining if the user is a valid user. If the user is determined to be not valid, then, the user is denied access to the web server. If the user is determined to be valid, and if a valid user password cookie exists, the user password cookie is updated using the shared secret key. However, if the second user is valid but no valid user password cookie exists, then, the user password cookie is generated using the shared secret key. Regardless, whether the second user password cookie is updated or generated, the user password cookie is transmitted in response to the request to connect the user to the second web server and the second web server is connected to the user. The second web server is part of the same common authentication ring as the web server.

Figure 5:
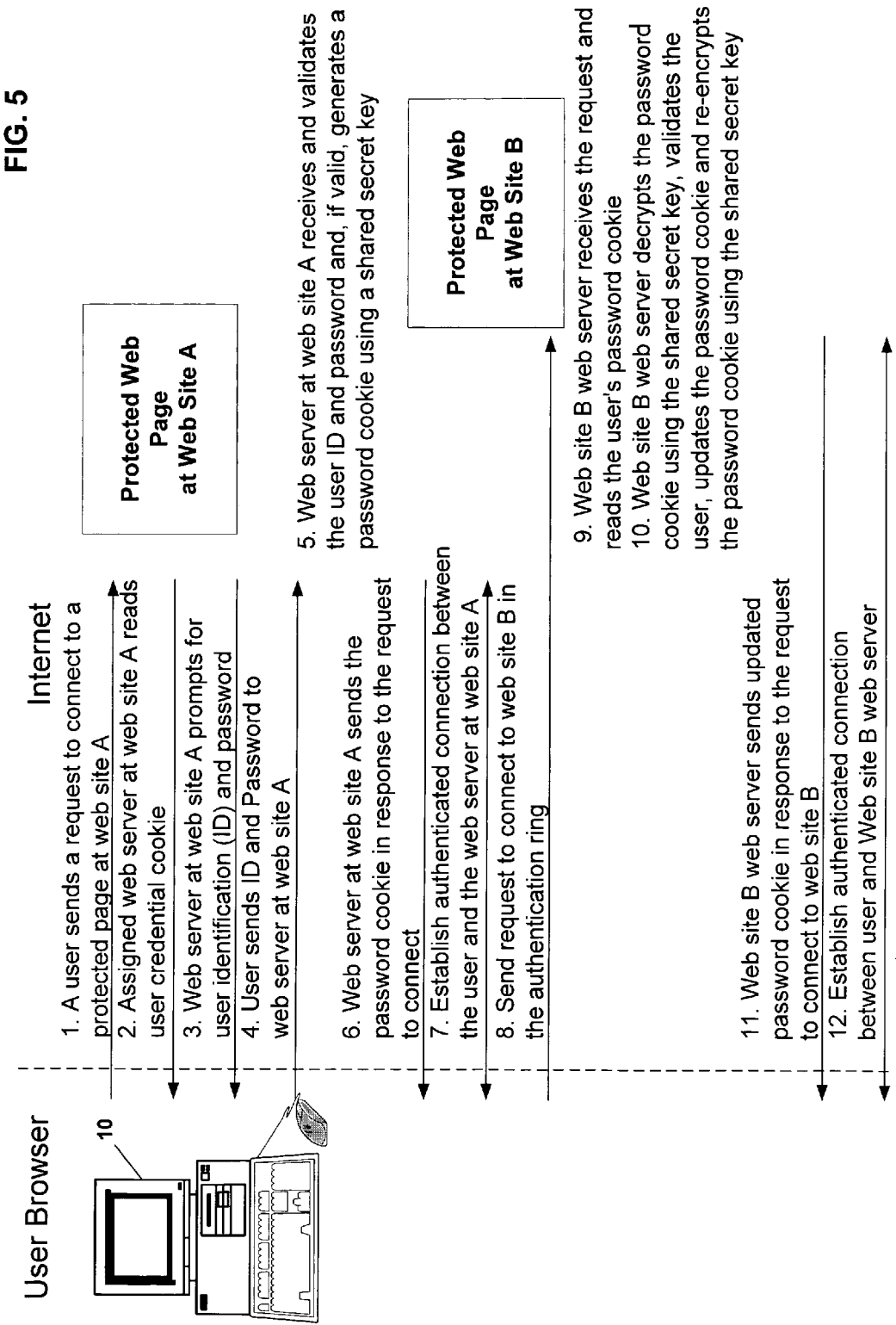
FIG. 5 illustrates a message flow diagram of an embodiment of the present invention.

FIG. 5 illustrates a message flow diagram in accordance with an embodiment of the present invention. In this embodiment, a user is accessing web pages from the Internet that are located at separate web sites.

In step 1, in FIG. 5 user requests to connect to web site entering the URL for a protected page of web site A in the address block of an Internet browser program (for example, Netscape Communicator or Microsoft Explorer) which is running on user workstation 10 and the user had used to connect to the Internet. After web site A receives the user's connection request, the request is assigned to an available web server, which contains the desired information. In step 2, the assigned web server reads the user's credential cookie. Then, in step 3, the web server sends a prompt for the user to enter a user ID and password. In step 4, the user enters and sends the user's user ID and password to the web server. In step 5, the web server receives and validates the user's ID and password and, if the password is valid, generates an encrypted password cookie using a shared secret key by encrypting the combination of, at least, the user's ID, password and a time stamp. The shared secret key is known by all web servers at web site A and web site B and web site A and web site B are associated in an authentication ring. In step 6, the web server at web site A sends the password cookie in response to the user's connection request. In step 7, the web server at web site A establishes an authenticated connection to the user, through the user's browser at workstation 10, to the requested page, which is resident on the web server at web site A. As the user moves through the web servers at web site A or as time passes it becomes necessary for the user to connect to a new web server at a new web site. As previously explained, this can be due either to the user explicitly requesting access to pages not accessible on the current web server/web site or as a result of web site A automatically transferring the user to the new server at the new web site. Several reasons can cause the web site to need to transfer users, for example, to balance the load on the web servers and related web sites or to maintain service if one of the web servers or web sites crashes. In step 8, a request is sent to web site B to connect web site B to the user. This request can be sent from either the user or the web server at web site A. In step 9, web site B receives the request and an available web server at web site B reads the user's password cookie. In step 10, the web server at web site B decrypts and validates the user's password cookie, updates the time stamp and re-encrypts the password cookie using the shared secret key. In step 11, the web server at web site B sends the re-encrypted password cookie in response to the request to connect web site B to the user. Finally, in step 12, the web server at web site B establishes an authenticated connection between the user's browser at workstation 10 and the requested page on the web server at web site B. While not shown in FIG. 5, if the password cookie is not valid in step 10, then, the web server at web site B will repeat steps 2 through 7 to obtain a valid password cookie and then connect to the user's browser at workstation 10. This procedure is used by all web servers in the same authentication ring as web sites A and B. While the embodiment of authentication ring 80 shown in FIG. 3 only comprises web sites A and B 40 and 60, respectively, the use of the present invention is not limited to this embodiment. In fact, any number and combination of users, associated web sites (that is, authentication rings or virtual private web rings) and web servers is possible. As before, no special code is required at the user's browser to implement the present invention.

FIG. 6 illustrates a flow diagram of another embodiment of the present invention. In this embodiment, a user is accessing pages from an internal company Intranet Sheltered Employment Retirement Plan ("SERP") web site and then requests access to a page or pages at a related Extranet Stock Option Plan ("SOP") web site that is part of the same authentication ring as the Intranet web site.

In step 1, in FIG. 6, the user requests to connect to the Intranet web site by entering the URL for a protected page of the web site in the address block of an Internet browser program (for example, Netscape Communicator or Microsoft Explorer) which is running on user workstation 10. After the Intranet SERP web site receives the user's connection request, the request is assigned to an available SERP web server, which contains the desired information. In step 2, the SERP web server reads the user's credential cookie. Then, in step 3, the SERP web server sends a prompt for the user to enter a user ID and password. In step 4, the user enters and sends the user's user ID and password to the SERP web server. In step 5, the SERP web server receives and validates the user's ID and password and, if the password is valid, generates an encrypted password cookie using a shared secret key by encrypting the combination of, at least, the user's ID, password and a time stamp. The shared secret key is known by all SERP web servers in the Intranet web site and the Extranet SOP web site and the Intranet SERP web site and Extranet SOP web site are associated in an authentication ring. In step 6, the SERP web server sends the password cookie in response to the user's connection request. In step 7, the SERP web server establishes an authenticated connection between the user's browser at workstation 10 and the requested page which is resident on the SERP web server at the Intranet SERP web site. As the user moves through the SERP web site or as time passes it becomes necessary for the user to connect to the external SOP web site. In step 8, a request is sent to connect to the Extranet SOP web site. This request can be sent from either the user or the SERP web server. In step 9, the Extranet SOP web site receives the request to connect to the user and an available web server at the Extranet SOP site and reads the user's password cookie. In step 10, the Extranet SOP web server decrypts and validates the user's password cookie, updates the time stamp and re-encrypts the password cookie using the shared secret key. In step 11, the Extranet SOP web server sends the re-encrypted password cookie in response to the request to connect the user to the Extranet SOP web site. In step 12, the Extranet SOP web server establishes an authenticated connection with the user's browser at workstation 10 to the requested page on the Extranet SOP web server. While not shown in FIG. 6, if the password cookie is not valid in step 10, then, the Extranet SOP web server repeats steps 2 through 7 to obtain a valid password cookie and then connects to the user's browser at workstation 10. While this embodiment of an authentication ring only comprises an Intranet web site and an Extranet web site, the use of the present invention is not limited to this embodiment. In fact, any number and combination of users, associated web sites (that is, authentication rings or virtual private web rings) and web servers is possible. In addition, no special code is required at the user's browser to implement the present invention.

A general embodiment of a web server for use in accordance with the present invention includes a processor unit coupled to a communications unit and a memory unit which is also coupled to the processor unit. The memory unit has a computer program stored in the memory unit and the computer program, which, when executed by the processor unit, configures the web server to receive a request to connect a valid user to the computer system through the communications unit, creates a user password cookie using a shared secret key and transmits the user password cookie to the valid user. In a simplified embodiment in accordance with the present invention, the web server includes an Intel® Pentium® processor coupled to a modem for communicating with the users and other web servers. The processor is also coupled to a main system random access memory ("RAM"), such as a dynamic RAM ("DRAM"), and to a mass memory storage system, such as a hard disk. The above described web server embodiments are merely illustrative of the possible embodiments and in no way limit the possible embodiments of the web servers that can be used with the present invention.

It should, of course, be understood that while the present invention has been described mainly in terms of Internet-based web site embodiments, those skilled in the art will recognize that the principles of the invention may be used advantageously with alternative embodiments involving local area networks and Internet portal sites as well as other communication networks. Accordingly, all such implementations which fall within the spirit and the broad scope of the appended claims will be embraced by the principles of the present invention.

What is claimed is:

1. A method of providing distributed web server authentication, said method comprising:
   receiving a request to connect a valid user to a web server;
   creating a user password cookie using a shared secret key, wherein the web server is part of a common authentication ring having a plurality of web servers each of the plurality of web servers having the shared secret key; and
   transmitting the user password cookie in response to the request to connect.

2. The method of claim 1, wherein creating a user password cookie using a shared secret key, comprises:
   reading a user credential cookie;
   requesting a user identification (ID) and password;
   receiving the user ID and password; and
   validating the valid user's identity.

3. The method of claim 2, wherein validating the valid user's identity, comprises:
   authenticating the user ID and password with the user credential cookie using a local authenticating mechanism.

4. The method of claim 3, wherein the local authenticating mechanism comprises an operating system.

5. The method of claim 2, wherein creating a user password cookie using the shared secret key, further comprises:
   combining at least the user ID and password with a time stamp; and
   encrypting the combined at least user ID, password and time stamp using the shared secret key.

6. The method of claim 1, wherein creating a user password cookie using a shared secret key, comprises:
   obtaining the user password cookie;
   verifying that the user password cookie is valid; and
   updating the user password cookie using the shared secret key.

7. The method of claim 6, wherein updating the user password cookie using the shared secret key, comprises:
   combining at least a user identification (ID) and password with a time stamp; and
   encrypting the combined at least user ID, password and time stamp using the shared secret key.

8. The method of claim 1, further comprising:
   authenticating a second valid user requesting access to the web server.

9. The method of claim 8, wherein authenticating a second valid user requesting access to the web server, comprises:
   receiving a request to connect the second valid user to the web server; and
   creating a second user password cookie using the shared secret key; and
   transmitting the second user password cookie in response to the request to connect the second valid user.

10. The method of claim 1, further comprising:
authenticating the valid user at a second web server, wherein the web server and the second web server are part of the common authentication ring.

11. The method of claim 10, wherein authenticating the valid user at a second web server, comprises:
receiving a request to connect the valid user to the second web server;
updating the user password cookie using the shared secret key; and
transmitting the user password cookie in response to the request to connect the valid user to the second web server.

12. A computer-readable medium having stored therein a computer program for providing distributed web server authentication of a valid user requesting access to a web server, said program comprising instructions for:
receiving a request to connect the valid user to the web server;
creating a user password cookie using a shared secret key, wherein the web server is part of a common authentication ring having a plurality of web servers each of the plurality of web servers having the shared secret key; and
transmitting the user password cookie in response to the request to connect.

13. The computer-readable medium of claim 12, wherein creating a user password cookie using a shared secret key, comprises:
reading a user credential cookie;
requesting a user identification (ID) and password;
receiving the user ID and password; and
validating the valid user's identity.

14. The computer-readable medium of claim 13, wherein validating the valid user's identity, comprises:
authenticating the user ID and password with the user credential cookie using a local authenticating mechanism.

15. The computer-readable medium of claim 14, wherein the local authenticating mechanism comprises an operating system.

16. The computer-readable medium of claim 13, wherein creating a user password cookie using the shared secret key, further comprises:
combining at least the user ID and password with a time stamp; and
encrypting the combined at least user ID, password and time stamp using the shared secret key.

17. The computer-readable medium of claim 12, wherein creating a user password cookie using a shared secret key, comprises:
obtaining the user password cookie;
verifying that the user password cookie is valid; and
updating the password cookie using the shared secret key.

18. The computer-readable medium of claim 12, further comprising:
authenticating a second valid user requesting access to the web server.

19. The computer-readable medium of claim 18, wherein authenticating a second valid user requesting access to the web server, comprises:
receiving a request to connect the second valid user to the web server;
creating a second user password cookie using the shared secret key; and
transmitting the second user password cookie in response to the request to connect the second valid user.

20. The computer-readable medium of claim 12, further comprising:
authenticating the valid user at a second web server, wherein the web server and the second web server are part of the common authentication ring.

21. The computer-readable medium of claim 20, wherein authenticating the valid user at a second web server, comprises:
receiving a request to connect the valid user to the second web server;
updating the user password cookie using the shared secret key; and
transmitting the user password cookie in response to the request to connect the valid user to the second web server.

22. An apparatus for providing distributed web server authentication, said apparatus comprising:
a plurality of computer systems, wherein each of said plurality of computer systems is coupled to at least one other of said plurality of computer systems, and wherein each of said plurality of computer systems includes:
a processor unit;
a communications unit coupled to said processor unit;
a memory unit coupled to said processor unit; and
a computer program stored in the memory unit, said computer program, which, when executed by the processor unit configures said computer system for:
receiving a request to connect a valid user to the computer system through the communications unit;
creating a user password cookie using a shared secret key, wherein the shared secret key is shared by each of said plurality of computer systems; and
transmitting the user password cookie to the user.

23. A method of providing distributed web server authentication, said method comprising:
receiving, by a web server, a request to connect a user to the web server;
determining if the user is a valid user;
if the user is not valid, then
denying access to the user;
if the user is valid, then,
if a valid user password cookie exists, then,
updating the user password cookie using a shared secret key;
if no valid user password cookie exists, then,
generating the user password cookie using the shared secret key,
wherein the web server is part of a common authentication ring having a plurality of web servers each of the plurality of web servers having the shared secret key;
transmitting the user password cookie to the user; and
connecting the web server to the user.

24. The method of claim 23, wherein determining if the user is a valid user, comprises:
reading a user credential cookie;
requesting a user identification (ID) and password;
receiving the user ID and password; and
validating the user's identity.

25. The method of claim 23, wherein determining if the user is a valid user, comprises:
obtaining the user password cookie;
verifying that the user password cookie is valid;
if the user password cookie is valid, then, the user is valid;

if the user password cookie is not valid, then, the user is not valid.

26. The method of claim 24, wherein generating the user password cookie using the shared secret key, comprises:
   combining at least the user ID and password with a time stamp; and
   encrypting the combined at least user ID, password and time stamp using the shared secret key.

27. The method of claim 23, further comprising:
   establishing a connection between the web server and a second user using a second user password cookie and the shared secret key.

28. The apparatus of claim 22, wherein said computer program, which, when executed by the processor unit further configures said computer system for:
   connecting the user to the computer system.

29. The method of claim 1, further comprising connecting the valid user to the web server.

30. The method of claim 9, further comprising connecting the second valid user to the web server.

31. The method of claim 11, further comprising connecting the valid user to the second web server.

* * * * *